United States Patent Office 3,534,008
Patented Oct. 13, 1970

3,534,008
STABILIZED VINYL CHLORIDE/VINYL ALCOHOL COPOLYMERS AND A PROCESS FOR THEIR PRODUCTION
Marvin Koral, Warren, and Elliott Farber, Trenton, N.J., assignors to Tenneco Chemicals, Inc., a corporation of Delaware
No Drawing. Filed June 7, 1968, Ser. No. 735,176
Int. Cl. C08f 27/14, 27/16
U.S. Cl. 260—87.1                                           10 Claims

ABSTRACT OF THE DISCLOSURE

Heat stable vinyl chloride/vinyl alcohol copolymers are prepared by alcoholyzing a vinyl chloride/vinyl acetate copolymer with methanol or ethanol in the presence of a strong acid catalyst and adding to the resulting alcoholysis reaction mixture water and sufficient calcium hydroxide to bring its pH to the range of 5 to 9 before isolating the copolymer.

---

This invention relates to heat stable vinyl chloride/vinyl alcohol copolymers and to a process for their production. More particularly, it relates to the production of vinyl chloride/vinyl alcohol copolymers that are characterized by excellent heat stability, color, clarity, adhesion, and other valuable properties.

Copolymers of vinyl chloride and vinyl alcohol are usually prepared by alcoholyzing the corresponding vinyl chloride/vinyl acetate copolymers with methanol or ethanol in the presence of an acidic or alkaline catalyst. When the vinyl acetate portions of the polymer molecule are to be completely alcoholyzed, the alcoholysis reaction is preferably carried out in the presence of a strong acid, such as sulfuric acid, ethylsulfuric acid, or p-toluenesulfonic acid. The copolymers are then precipitated from the alcoholysis mixture by the addition of water and isolated. The copolymers prepared in this way generally have unsatisfactory heat stability and tend to discolor when they are heated during processing and fabrication steps. While their degradation on heating may not detract to any appreciable extent from the physical properties of the copolymers, the discoloration seriously restricts their use in many applications. The use of organometallic and other heat stabilizers adds appreciably to the cost of the copolymers.

In accordance with this invention, it has been found that the heat stability of vinyl chloride/vinyl alcohol copolymers can be substantially improved by treating the acidic alcoholysis reaction mixtures with sufficient calcium hydroxide to bring them to a pH in the range of about 5 to 9 prior to the isolation of the copolymer. The resulting copolymers are characterized by excellent heat stability, color, clarity, adhesion, and other valuable properties.

In a preferred embodiment of this invention, a vinyl chloride copolymer that contains from about 1 percent to 30 percent, and preferably 5 percent to 20 percent, of vinyl acetate is heated at a temperature in the range of about 50° C. to 80° C. with a stoichiometric excess of methanol or ethanol in the presence of a strong acid catalyst and a solvent, such as tetrahydrofuran, until alcoholysis of the vinyl acetate portions of the polymer molecule is complete. To the alcoholysis reaction mixture is added an amount of an aqueous suspension of calcium hydroxide that is sufficient to bring its pH to the range of about 5 to 9 and preferably 6 to 8 and thereby simultaneously precipitate the vinyl chloride/vinyl alcohol polymer from solution and stabilize it. The precipitated copolymer is then isolated, washed with water and dried.

The aqueous suspension that is used to neutralize the alcoholysis reaction mixture generally contains about 2 grams to 10 grams of calcium hydroxide per liter of water.

In other embodiments of the invention, calcium hydroxide or calcium oxide is added to the alcoholysis mixture prior to or following the addition of sufficient water to precipitate the copolymer.

The exact mechanism by which calcium hydroxide stabilizes the vinyl chloride/vinyl alcohol copolymers is not fully understood at this time. The stabilization reaction appears to involve more than neutralization of the acidic alcoholysis catalyst and/or elimination of impurities or contaminants by complex formation or chelation since the use of other neutralizing agents, such as sodium hydroxide or ammonium hydroxide, or the use of other alkaline earth metal compounds, such as calcium chloride, barium chloride, and barium hydroxide, does not appreciably improve the heat stability of the vinyl chloride/vinyl alcohol copolymers.

The invention is further illustrated by the examples that follow. In these examples, all parts are parts by weight.

EXAMPLE 1

A solution that contained 150 parts of a vinyl chloride/vinyl acetate copolymer that contained about 87 percent of vinyl chloride (Tenneco 315), 600 parts of methanol, 600 parts of tetrahydrofuran, and 11 parts of concentrated sulfuric acid was heated at its reflux temperature (68° C.) for 16 hours. At the end of this time, the copolymer had been completely alcoholyzed to the corresponding vinyl chloride/vinyl alcohol copolymer as was indicated by infrared analysis.

EXAMPLE 2

To a portion of the vinyl chloride/vinyl alcohol copolymer solution whose preparation was described in Example 1 was added a suspension of calcium hydroxide (3.6 grams per liter of water) with rapid agitation until a pH of 6 was attained. The precipitated product was filtered, washed with demineralized water, and dried at 45° C. overnight.

EXAMPLE 3

The procedure of Example 2 was repeated using the amount of the calcium hydroxide suspension that would bring the pH of the mixture to 7.

EXAMPLE 4

The procedure of Example 2 was repeated using the amount of the calcium hydroxide suspension that would bring the pH of the mixture to 8.

COMPARATIVE SAMPLES

The procedure of Example 2 was repeated using the following materials in place of the calcium hydroxide suspension:

| Comp. ex. | Neutralizing agent | End point of addition of neutralizing agent |
|---|---|---|
| A | 5% aqueous calcium chloride solution | Disappearance of color. |
| B | 5% aqueous sodium hydroxide solution | pH 6. |
| C | Concentrated ammonium hydroxide solution. | pH 6. |
| D | 5% barium chloride solution | Disappearance of color. |
| E | Water | Completion of precipitation. |
| F | Aqueous suspension of barium hydroxide hexahydrate. | pH 7. |

EXAMPLE 5

The thermal stability of the products of Examples 2–4 and Comparative Examples A–F was determined by the following procedure: Each copolymer was dissolved in tetrahydrofuran. The solutions were drawn down to a 6-mil thickness on a glass plate and baked at 105° C. for 5 minutes. The films were then heated at 180° C. until they became discolored. The times required for the films to develop color were as follows:

| Copolymer: | Heat stability (minutes at 180° C. before films discolored) |
|---|---|
| Product of Ex. 2 | 7.5 |
| Product of Ex. 3 | 7.5 |
| Product of Ex. 4 | 7.5 |
| Product of Comp. Ex. A | 3.0 |
| Product of Comp. Ex. B | 3.0 |
| Product of Comp. Ex. C | 3.0 |
| Product of Comp. Ex. D | 3.0 |
| Product of Comp. Ex. E | 2.5 |
| Product of Comp. Ex. F | 2.5 |

The products prepared by the process of this invention became amber during this heating period; the comparative copolymers developed a greenish-black coloration on being heated at 180° C.

From the data in the foregoing table, it will be seen that the copolymers prepared by the process of this invention have far better heat stability than do the vinyl chloride/vinyl alcohol copolymers prepared by closely related procedures.

The terms and expressions which have been employed are used as terms of description and not of limitation, and there is no intention in the use of such terms and expressions of excluding any of the features shown and described or portions thereof, but it is recognized that various modifications are possible within the scope of the invention claimed.

What is claimed is:

1. In the process for the production of vinyl chloride/vinyl alcohol copolymers by the alcoholysis of vinyl chloride/vinyl acetate copolymers with an alcohol selected from the group consisting of methanol and ethanol in the presence of a strong acid catalyst, the improvement that comprises adding to the alcoholysis reaction mixture an amount of a neutralizing agent selected from the group consisting of calcium hydroxide and calcium oxide that will bring its pH to the range of 5 to 9 prior to the isolation of the copolymer.

2. The process of claim 1 wherein the amount of calcium hydroxide added is that which will bring the pH of the alcoholysis reaction mixture to the range of 6 to 8.

3. The process of claim 1 wherein the vinyl chloride/vinyl acetate copolymer that is subjected to alcoholysis contains from about 1 percent to 30 percent of vinyl acetate.

4. The process of claim 1 wherein the vinyl chloride/vinyl acetate copolymer that is subjected to alcoholysis contains from 5 percent to 20 percent of vinyl acetate.

5. The process of claim 1 wherein the alcoholyzing agent is methanol.

6. The process of claim 1 wherein the strong acid catalyst is sulfuric acid.

7. The process of claim 1 wherein an aqueous suspension of calcium hydroxide is added to the alcoholysis reaction mixture to simultaneously precipitate and stabilize the copolymer.

8. The process of claim 1 wherein a member selected from the group consisting of calcium hydroxide and calcium oxide is added to the alcoholysis reaction mixture before the copolymer is precipitated by the addition of water.

9. The process of claim 1 wherein a member selected from the group consisting of calcium hydroxide and calcium oxide is added to the alcoholysis reaction mixture after the copolymer has been precipitated by the addition of water.

10. Heat-stable vinyl chloride/vinyl alcohol copolymers that contain about 70 percent to 99 percent of vinyl chloride units and 1 percent to 30 percent of vinyl alcohol units, said copolymers being the products prepared by the process of claim 1.

References Cited

UNITED STATES PATENTS

| 1,932,889 | 10/1933 | Groff | 260—45.7 |
| 2,075,251 | 3/1937 | Winkelmann | 260—45.7 |
| 2,356,282 | 8/1944 | Stamatoff | 260—91.3 |
| 2,265,400 | 12/1944 | Fikentscher | 260—45.7 |
| 2,496,480 | 2/1950 | Lavin et al. | 260—73 |
| 2,499,924 | 3/1950 | Lavin | 260—91.3 |
| 2,512,726 | 6/1950 | Penn et al. | 260—19 |

FOREIGN PATENTS 470,017  12/1950  Canada.

DONALD E. CZAJA, Primary Examiner

R. A. WHITE, Assistant Examiner

U.S. Cl. X.R.

260—45.7